No. 829,998. PATENTED SEPT. 4, 1906.
H. PARKER.
NON-REFILLABLE BOTTLE.
APPLICATION FILED JAN. 6, 1906.
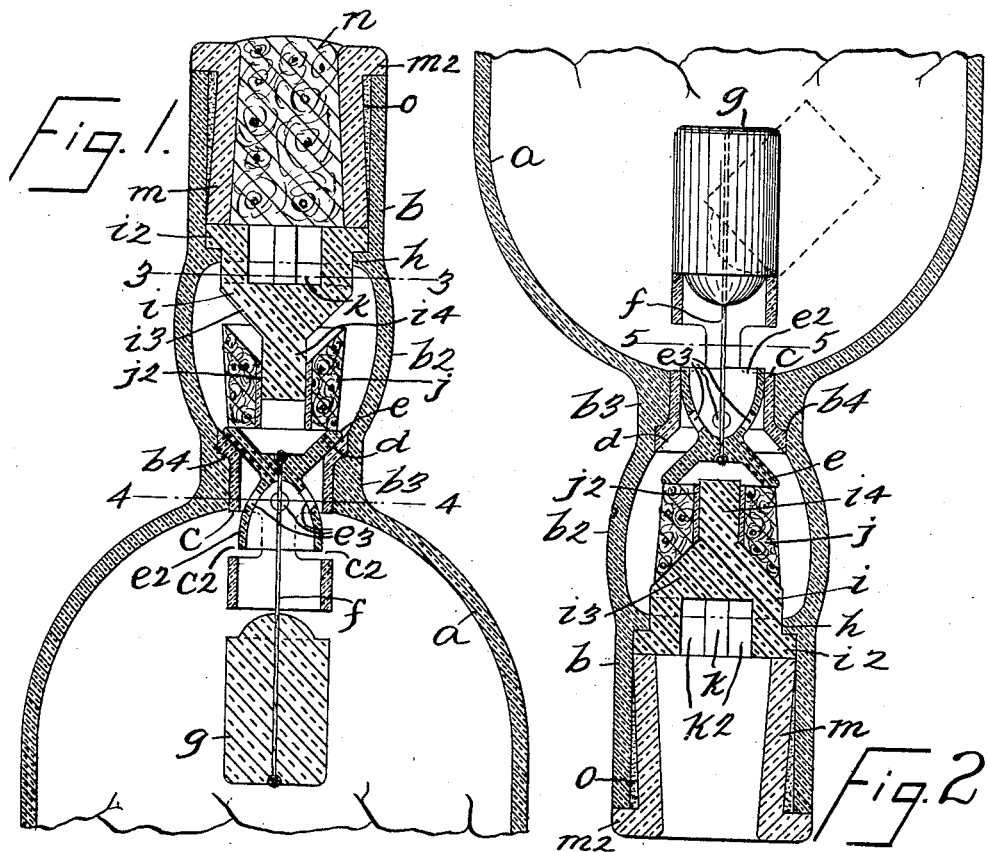
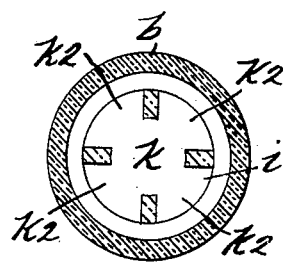
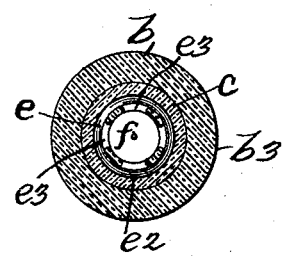
WITNESSES
J. C. Larsen
J. A. Stewart
INVENTOR
Henry Parker
BY Edgar Tate & Co
ATTORNEYS

UNITED STATES PATENT OFFICE.

HENRY PARKER, OF BROOKLYN, NEW YORK.

NON-REFILLABLE BOTTLE.

No. 829,998.  Specification of Letters Patent.  Patented Sept. 4, 1906.

Application filed January 6, 1906. Serial No. 294,861.

*To all whom it may concern:*

Be it known that I, HENRY PARKER, a citizen of the United States, residing at Brooklyn, in the county of Kings and State of New York, have invented certain new and useful Improvements in Non-Refillable Bottles, of which the following is a specification, such as will enable those skilled in the art to which it appertains to make and use the same.

This invention relates to bottles, jugs, jars, and similar vessels; and the object thereof is to provide a vessel of this class with a neck attachment which is so constructed that when the vessel has been filled and the neck attachment applied the vessel may be emptied of its contents, but cannot be refilled or reused.

In the drawings forming part of this specification I have shown my improvement applied to a bottle, and the invention is fully disclosed in the following specification, of which the accompanying drawings form a part, in which the separate parts of my improvement are designated by suitable reference characters in each of the views, and in which—

Figure 1 is a central vertical section of the upper part of a bottle, the neck of which is provided with my improvement; Fig. 2, a similar view showing the bottle inverted; Fig. 3, a section on the line 3 3 of Fig. 1; Fig. 4, a section on the line 4 4 of Fig. 1, and Fig. 5 a section on the line 5 5 of Fig. 2.

In the practice of my invention, as shown in the drawings, I provide a bottle $a$, having a neck $b$, the lower half portion of which is slightly enlarged, as shown at $b^2$, but the extreme lower portion of which is contracted, as shown at $b^3$, and within the top portion of the contracted bottom part of the neck is formed an annular groove $b^4$, and in practice I secure in the bottom part of the neck a tube or sleeve $c$, which extends downwardly into the neck a predetermined distance, and the side portions of which are provided with openings forming ports or passages $c^2$, and the upper end of the tube or sleeve $c$ is flared outward and fits in the annular groove $b^4$ and forms a conical valve-seat $d$, on which is placed an inverted hollow conical valve $e$, the apex end of which is directed downwardly and provided with a depending hollow conical member $e^2$, the upper and smaller end portion of which is provided with side ports or passages $e^3$, and the depending hollow conical portion $e^2$ of the valve $e$ at its greatest diameter is such as to fit snugly in the tube or sleeve $c$, while being free to move therein, and the valve $e$, together with the depending hollow conical member $e^2$ thereof, constitutes a double conical valve, the part $e$ constituting the valve proper. Secured in the central portion of the double conical valve comprising the parts $e$ and $e^2$ is a flexible cord $f$, preferably composed of silk, and which passes downwardly through the tube or sleeve $c$ and is secured to a weight $g$, which is preferably composed of glass. In the central top portion of the neck $b$, at the top of the enlarged portion $b^2$, is an inwardly-directed annular shoulder $h$, which supports a guard-plug $i$, having a top rim or flange $i^2$, which rests on the annular shoulder $h$, and provided with a depending conical tapered bottom portion $i^3$, having a depending or projecting portion $i^4$, on which is mounted a tubular float $j$, provided with a lining $j^2$, preferably composed of glass, and the guard-plug $i$, tube or sleeve $c$, and the combination-valve $e$ $e^2$ are also preferably composed of glass. In the top portion of the guard-plug $i$ is a chamber or recess $k$, which opens upwardly and at the bottom of which are side ports or passages $k^2$, which open below the annular shoulder $h$, and in assembling the various parts of the neck attachment the bottom portion of the valve $e$ $e^2$ is inserted into the tube or sleeve $c$, with the cord $f$ secured in the valve, and the weight $g$ is then secured to the cord $f$, and the said parts are then inserted into the neck of the bottle, and the tube or sleeve $c$ is secured in said neck in any desired way. It will be understood, of course, that before the parts $c$, $e$ $e^2$, and $g$ are secured in the neck, as above described, the bottle is first filled, and after this the float $j$ is placed in position and the guard-plug $i$ is inserted. Within the top of the neck $b$ after the bottle has been filled and the parts $c$, $e$ $e^2$, $g$, and $i$ placed in position, as hereinbefore described, I secure in the upper end or top of the neck $b$ a tubular plug $m$, adapted to receive an ordinary cork or stopper $n$. In practice I prefer to so form the tubular plug $m$ that the lower end thereof will be larger than the upper end, and I provide the upper end with an annular flange or rim $m^2$, which rests on the top of the neck, and said plug is preferably secured in the neck by cement $o$; but my invention is not limited to the shape of the tubular plug $m$, nor to any particular means for securing it in the neck, all that is necessary in this connection being to secure the said tubular plug *m* in the neck *b* in such manner that said plug cannot be removed without breaking the neck of the bottle.

When the bottle has been filled and the separate parts of the neck attachment applied, the bottle is sealed by forcing in the cork or stopper *n* in the usual manner, and whenever it is desired to empty the bottle or discharge a portion of its contents the cork or stopper *n* is removed and the bottle is inverted, as shown in Fig. 2, and in this operation the bottle must be manipulated so as to cause the weight *g* to stand upright on the inverted end of the tube or sleeve *c*, as shown in said figure, and when the parts are in this position the valve *e e²* will drop downwardly into the position shown in said figure and rest on the float *j*, which rests on the guard-plug *i*, and the contents of the bottle will flow out through the valve *e e²*, through the ports or passages *e³* in the bottom portion of said valve, around the float *j*, and through the ports or passages *k²* and chamber or recess *k* in the guard-plug *i*. Unless the weight *g* is caused to stand upright on the tube or sleeve *c*, as shown in Fig. 2, the said weight will, by means of the cord *f*, hold the valve to its seat *d*; but when the weight *g* is standing in the position shown in Fig. 2 the valve will assume the position shown in said figure, as above described. After the bottle has been emptied, or partially so, if an attempt be made to refill or partially refill the same by holding the bottle in an upright or partially-upright position and pouring liquids thereinto the valve *e e²* will at once assume the position shown in Fig. 1 or will rest on the valve-seat *d* and will securely close the neck of the bottle and no liquids can be poured into it, and this operation of the said valve will be the same in any position in which the bottle can be held in an attempt to pour liquids thereinto. If an attempt be made to force liquids into the bottle by holding it in an inverted or partially-inverted position, the weight *g* will either be tilted over the end of the tube or sleeve *c*, in which position it will raise the valve to its seat, or said weight will rest on said tube or sleeve, as shown in Fig. 2, in which position of said weight the float *j* will operate to raise the valve *e e²* to its seat and no liquids can be forced into the bottle.

It will be apparent that my improvement may be applied to any kind or class of vessel having a neck, as well as to a bottle, and the float *j* may be made of any desired material, such as cork or fibrous material saturated with paraffin or a preservative compound, which will render the said float impervious to all kinds of liquids.

Although I have described the valve *e e²* as composed of two hollow conical parts connected centrally, it will be seen that said valve consists of a single device, the central walls of which are contracted annularly and the end portions of which are both hollow and conical in form; but it will be apparent that various changes in and modifications of this construction may be made without departing from the spirit of my invention or sacrificing its advantages. It will also be seen that when the bottle is in an upright position the float *j* rests on the valve *e e²*, and when the bottle is inverted, as shown in Fig. 2, the said valve rests on said float.

By forming the guard-plug *i* in the manner described or providing the same with a central recess or chamber in the top thereof and laterally-directed ports or passages communicating therewith I prevent the insertion of a wire or other instrument in an attempt to interfere with the operation of the valve and float, and it will be apparent that the construction of the guard-plug *i* may also be modified within certain limits without departing from the spirit of my invention or sacrificing its advantages.

Having fully described my invention, what I claim as new, and desire to secure by Letters Patent, is—

1. A vessel provided with a neck the central bottom portion of which is enlarged and provided at its lower end with a tube which is secured therein and the lower end portion of which projects downwardly into the vessel and the upper end portion of which is formed into a valve-seat, that part of said tube within the vessel being provided with side ports or passages, a double conical valve mounted in said tube and the upper end portion of which is adapted to rest on said valve-seat, and the lower end portion of which is movable in said tube and provided with side ports or passages, a cord connected with said valve and extending downwardly through said tube, a weight connected with the lower end of said cord, a guard-plug secured in the neck at the top of the enlarged portion thereof and provided with side ports or passages and with a depending member, and a float movable vertically on said depending member and adapted in the upright position of the vessel to rest on said valve, substantially as shown and described.

2. A vessel provided with a neck the central bottom portion of which is enlarged and provided at its lower end with a tube which is secured therein and the lower end portion of which projects downwardly into the vessel and the upper end portion of which is formed into a valve-seat, that part of said tube within the vessel being provided with side ports or passages, a double conical valve mounted in said tube and the upper end portion of which is adapted to rest on said valve-seat, and the lower end portion of which is movable in said tube and provided with side ports or passages, a cord connected with said valve and extending downwardly through said tube, a weight connected with the lower end of said cord, a guard-plug secured in the neck at the top of the enlarged portion thereof and provided with side ports or passages and with a depending member, and a float movable vertically on said depending member and adapted in the upright position of the vessel to rest on said valve, the neck of the vessel being also provided with a tubular plug which is secured therein above the guard-plug and adapted to receive a stopper, substantially as shown and described.

3. A vessel of the class described provided with a neck the bottom central portion of which is enlarged, a tube secured on the bottom of the neck and projecting into the vessel and provided with side ports or passages and the upper end of which is formed into a valve-seat, a vertically-movable double conical valve mounted in said tube and the upper end of which is adapted to rest on said valve-seat, and the lower end portion of which is provided with side ports or passages, a flexible device connected with said valve and extending downwardly through said tube, a float mounted in the neck above the valve and adapted to rest on said valve when the vessel is in an upright position, a guard-plug secured in the neck above said float and forming a guide therefor, said guard-plug being provided in the top thereof with a chamber or recess and with laterally-directed ports or passages, substantially as shown and described.

In testimony that I claim the foregoing as my invention I have signed my name, in presence of the subscribing witnesses, this 4th day of January, 1906.

HENRY PARKER.

Witnesses:
    F. A. STEWART,
    C. E. MULREANY.